(No Model.)  3 Sheets—Sheet 1.
F. W. HEINKE.
WINDMILL.
No. 263,515. Patented Aug. 29, 1882.
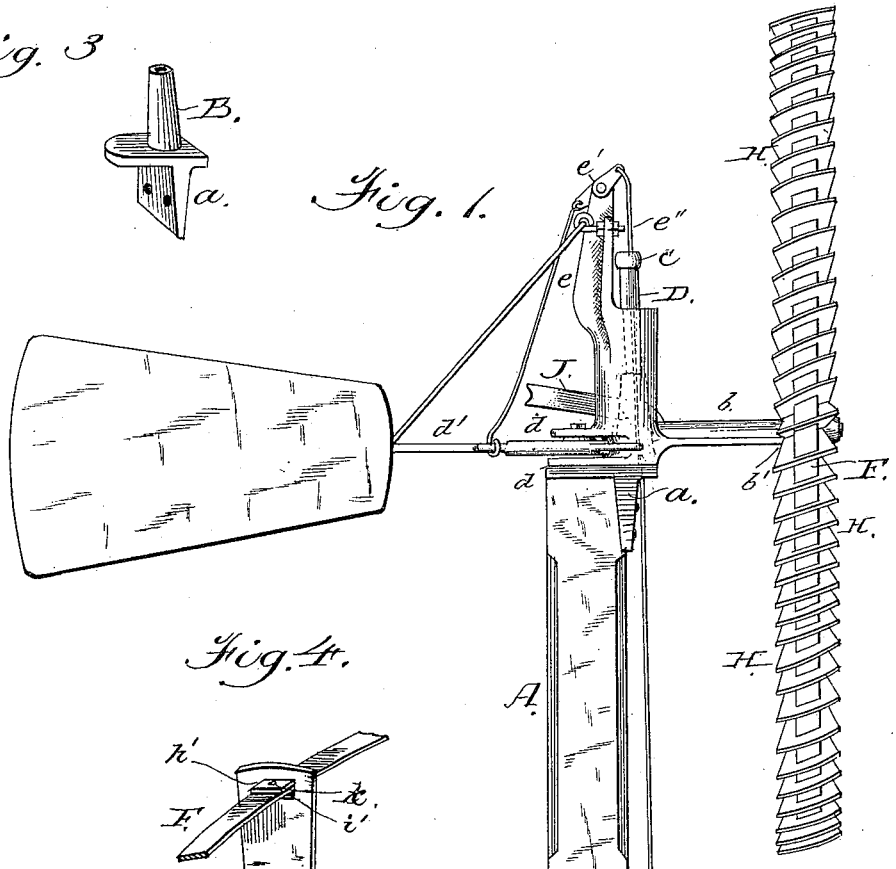
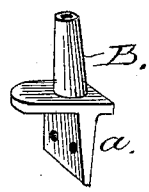
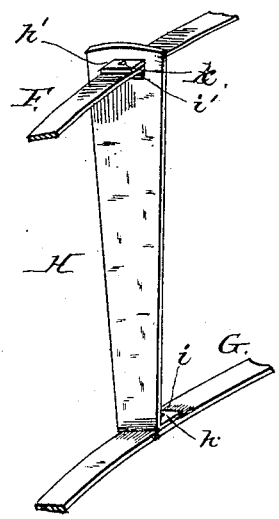
Witnesses:
Walter Fowler
Warren Parsons
Inventor:
F. W. Heinke
by A. N. Evans & Co
Atty (No Model.) 3 Sheets—Sheet 2.

F. W. HEINKE.
WINDMILL.

No. 263,515. Patented Aug. 29, 1882.

Witnesses:
Walter Fowler
Warren Parsons

Inventor:
F. W. Heinke
by A. N. Evans & Co
Attys.

(No Model.) 3 Sheets—Sheet 3.
F. W. HEINKE.
WINDMILL.
No. 263,515. Patented Aug. 29, 1882.
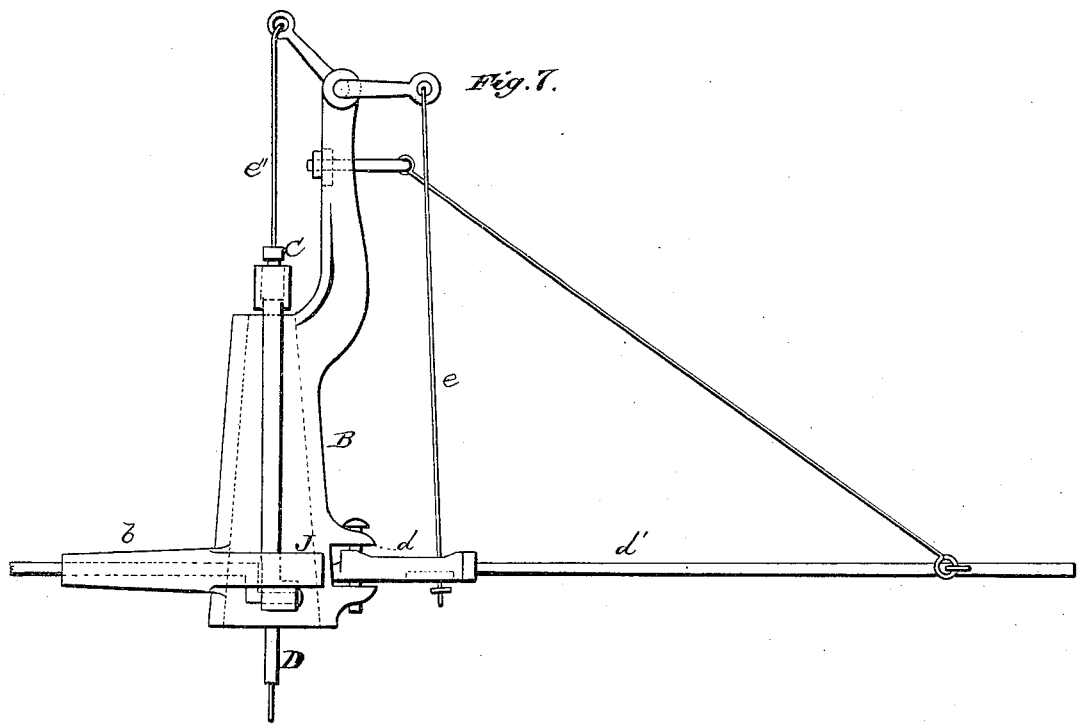
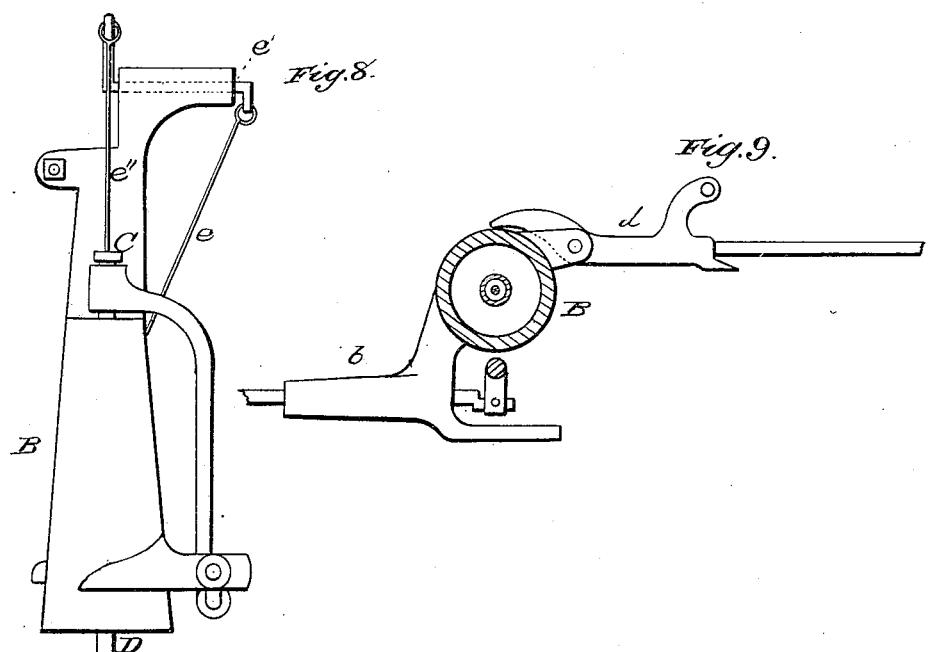
WITNESSES
Emory H. Bates
Philip C. Musi
INVENTOR
F. W. Heinke
Per A. H. Evans & Co.
ATTORNEYS

UNITED STATES PATENT OFFICE.

FRIEDRIK W. HEINKE, OF NEBRASKA CITY, NEBRASKA.

WINDMILL.

SPECIFICATION forming part of Letters Patent No. 263,515, dated August 29, 1882.

Application filed January 13, 1882. (No model.)

*To all whom it may concern:*

Be it known that I, FRIEDRIK W. HEINKE, of Nebraska City, in the county of Otoe and State of Nebraska, have invented certain Improvements in Windmills; and I hereby declare that the following is a full, clear, and exact description thereof, reference being had to the accompanying drawings, making part of this specification, in which—

Figure 2:
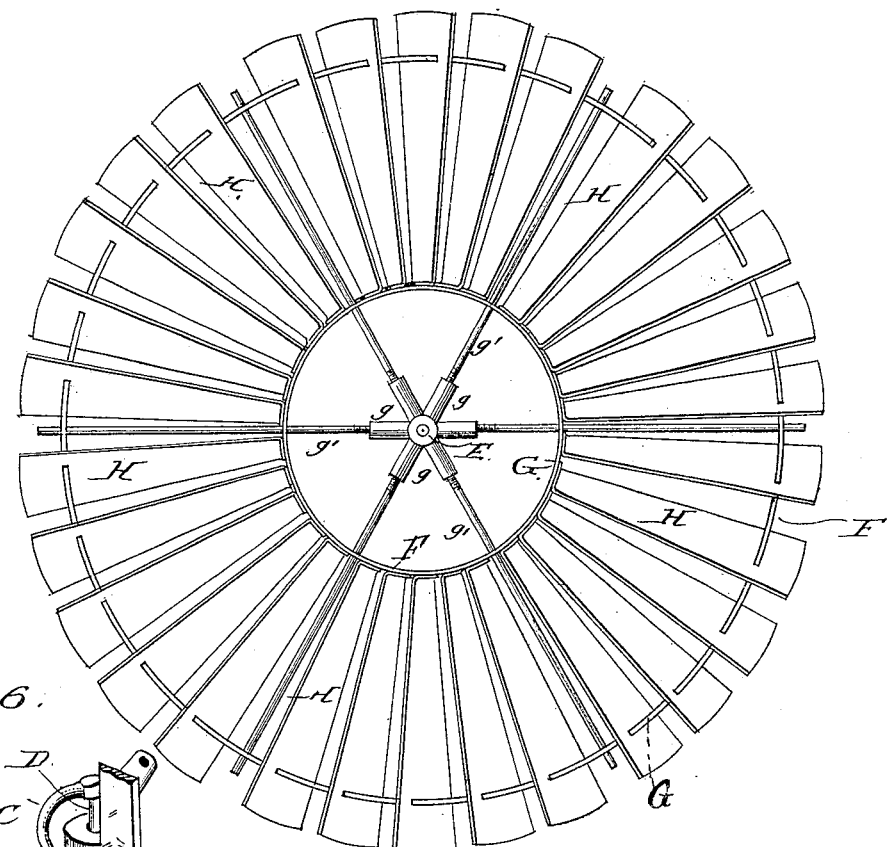
Figure 6:
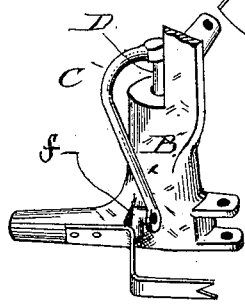
Figure 5:
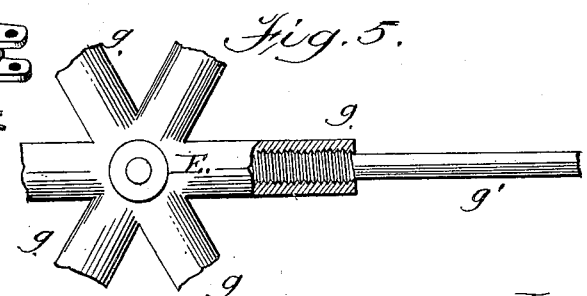

Figure 1 is a side elevation of the windmill. Fig. 2 is a view showing the wheel in front elevation. Figs. 3, 4, 5, and 6 are details to be referred to. Figs. 7 and 8 are side elevations in positions varying from the position shown in Fig. 1, and Fig. 9 is a sectional plan view.

My invention relates to windmills; and my invention consists in certain details of construction whereby I obtain simplicity and durability, and provide a fixed hollow spindle, upon which turns a cast-iron turn-table, all of which will be hereinafter fully described and specifically claimed.

In order that those skilled in the art may make and use my invention, I will proceed to describe the manner in which I have carried it out.

In the said drawings, A is the supporting-post, upon the top of which is bolted a bracket, $a$, from which rises a hollow spindle, B, preferably cast integral with the bracket and rising from its center, so as to be entirely out of line with post A, the object being to leave the hollow spindle B open for the passage of the reciprocating pitman D. The turn-table is cast, as seen in Fig. 1, with a projecting arm, $b$, which carries a bearing, $b'$, for the main shaft, with lugs $d\ d$, to receive the vane-supporting bar $d'$, and with an upwardly-projecting arm, $e$, provided with a bearing, $e'$, for a crank-lever operating on the vane, as hereinafter described, and an ear, $e''$, to receive the end of an adjustable slide, as hereinafter described. The wheel-supporting shaft has a crank on its inner end, $f$, to which is attached a curved pitman, C, the upper end of said pitman carrying the reciprocating rod D, which passes through hollow spindle B and conveys the power of the wheel. The wheel itself is constructed of a central casting or "spider," E, having radiating sockets $g$, into which screw radiating rods $g'\ g'$, forming the radial framework of the wheel. The circumferential framework is composed of iron bands F (near the outer ends of rods $g'$) and G, (near the inner ends of rods $g'$,) which support the blades H. The blades H are made from sheet-metal blanks, (see Fig. 4,) having their narrow ends turned up at $h$, and a tongue, $h'$, punched out near their broad ends. The turned-up portions $h$ and the tongues $h'$ project from opposite sides of the blades. The blades are attached to the frame-work by setting the turned-up ends $h$ against the surface of band G and riveting them, as seen at $i$, and band F is passed through the openings $i'$, made by punching out tongues $h'$, the said tongues being riveted to band F, as seen at $k$.

Bolted to one side of the journal-bearing for the main shaft is a forked safety-spring, J, the free end of which is so located that as the vane is thrown around to bring the wheel out of the wind the shank brings up against the forked end of the spring, so as to provide a yielding safety-stop.

There is no claim for novelty in the construction of the vane or the rods for throwing it in or out of the wind. The construction of the blades is such that they may be made to pitch to the right or left without any alteration whatever in the construction of the wheel.

Having thus described my invention, what I claim as new, and desire to secure by Letters Patent, is—

1. In a wind-wheel, the turn-table provided with the arm $b$ and the safety-spring J, in combination with the vane-supporting bar $d'$, substantially as specified.

2. The blade H, constructed of sheet metal, having its lower or narrow end turned up at $h$, and tongues $h'$ punched out at right angles near the opposite ends, substantially as set forth.

FRIED. W. HEINKE.

Witnesses:
JOHN C. WATSON,
HENRY SCHMITZ.